United States Patent [19]

Jordan, Jr. et al.

[11] 4,277,387

[45] Jul. 7, 1981

[54] PLASTICIZER COMBINATION OF ALKYLENE OXIDE-ALKYL PHENOL ADDUCT AND CARBOXYLIC ACID ESTER, AND CAULKING COMPOSITION

[75] Inventors: Arthur D. Jordan, Jr., Philadelphia; Joseph A. Lavelle, Bethlehem, both of Pa.

[73] Assignee: Rohm and Haas Company, Philadelphia, Pa.

[21] Appl. No.: 153,350

[22] Filed: May 27, 1980

Related U.S. Application Data

[60] Continuation of Ser. No. 88,200, Oct. 23, 1979, abandoned, which is a division of Ser. No. 917,436, Jun. 20, 1978, abandoned.

[51] Int. Cl.$^3$ .......................... C08K 5/09; C08K 5/10; C09J 3/14
[52] U.S. Cl. ........................ 260/29.7H; 260/29.6 PS; 260/31.8 R; 260/31.4 R
[58] Field of Search ................... 260/29.6 PS, 31.8 R, 260/29.7 H, 31.4 R

[56] References Cited

U.S. PATENT DOCUMENTS

| | | | |
|---|---|---|---|
| 3,561,996 | 2/1971 | Young | 427/407.1 |
| 3,749,692 | 7/1973 | Jacob et al. | 260/29.6 PS |

OTHER PUBLICATIONS

Union Carbide-UCAR Latex 153.

Primary Examiner—Joseph L. Schofer
Assistant Examiner—Peter F. Kulkosky

[57] ABSTRACT

Disclosed is a plasticizing composition and caulks or sealants containing the same. The plasticizer is a combination of (1) a water insoluble adduct of ethylene oxide or propylene oxide and an alkyl phenol and (2) an ester type of plasticizer. Aqueous latex caulks are disclosed.

17 Claims, No Drawings

PLASTICIZER COMBINATION OF ALKYLENE OXIDE-ALKYL PHENOL ADDUCT AND CARBOXYLIC ACID ESTER, AND CAULKING COMPOSITION

This application is a continuation in part of Ser. No. 088,200, filed Oct. 23, 1979, which in turn is a div. of Ser. No. 917,436, filed June 20, 1978.

The invention concerns a combination of materials as a plasticizer composition and improved caulking or sealing materials containing the same. The caulks or sealants are used for filling structural joints in buildings and the like.

BACKGROUND OF THE INVENTION

Well known caulk or sealant compositions are exemplified in U.S. Pat. No. 3,561,996, to Young, and assigned to the same assignee as is the present application. An example in that patent is a caulking composition of 82.6% solids as follows:

"(4) (a) A caulking composition of 82.6% solids is made up by mixing 430.17 lbs. of a 55% solids aqueous dispersion of an emulsion copolymer of 81.5% ethyl acrylate, 15% methyl methacrylate, and 3.5% itaconic acid, 9.46 lbs. of tert-octylphenoxypoly(39)ethoxyethanol, 10.65 lbs of sodium hexametaphosphate, 124.21 lbs. of a plasticizer for the copolymer (an oxypropylene derivative of m,p-cresylic acid), 26.91 lbs. mineral spirits, 1.27 lbs. of a 30% aqueous polymethacrylic acid, 692.06 lbs. of pigment grade calcium carbonate extender, and 17.22 lbs. of titanium dioxide pigment."

The emulsion polymers and caulks of the present invention are similar, differing primarily in the plasticizer composition, and are prepared by known methods. Other prior patents of the same assignee are U.S. Pat. Nos. 3,919,146 a division of 3,786,020; 3,759,915; 3,554,942; 2,865,877 and 2,865,878. Some involve nonanalagous arts.

The latter two suggest, as pigment dispersants, (1) a water soluble salt of a copolymer of maleic anhydride with an olefin such as diisobutylene, and (2) a water-insoluble ethylene oxide in coatings. The adduct may have a plasticizing effect on the water soluble copolymers, and the two materials can serve as the sole binder in the coatings, or can be used together with acrylic polymers in dispersed or solubilized form. The water-soluble salts are extremely hard and inflexible, and are unsuitable as major components of caulks.

U.S. Pat. No. 2,889,297 discloses polyvinyl acetate adhesives plasticized with similar adducts of propylene oxide and alkyl phenols. As noted above, acrylic latex caulks have been proposed heretofore in which a plasticizer, of an adduct of propylene oxide and cresol in the mole ratio of 6:1, is recommended. Ester type plasticizers in the form of oil modified alkyds have been disclosed for caulks, particularly solvent based caulks, as shown for example in U.S. Pat. Nos. 3,919,146 and 3,759,915. U.S. Pat. No. 3,554,942 concerns water based acrylic sealant or spackling compositions.

DETAILED DESCRIPTION

It has been found in accordance with the present invention that the plasticizer combination of the invention is particularly valuable when used in caulking compositions containing an elastomeric binder of a synthetic polymer. Especially preferred is a latex of an addition polymer of olefinically unsaturated monomers prepared by emulsion polymerization, although solvent-based caulks are also useful.

According to the present invention, a putty-like mastic, caulking or sealant composition is provided in which the binder consists essentially of a conventional elastomeric synthetic polymer, as distinguised from the hard polymers for coatings mentioned heretofore. Optionally, one or more conventional materials in the form of an emulsifier, a dispersant, a base, a defoamer, a thickener, a small amount of an organic solvent in the latex system, a dye, a pigment, a filler, an adhesion promoter, or other conventional additive, is useful. Preferably one or more of a pigment, dye, or filler is present.

A particularly novel aspect of the invention resides in the use of an elastomer in the form of a latex with the water-insoluble plasticizer of the invention being a combination of (1) a water-insoluble or water-immiscible adduct of ethylene oxide or propylene oxide, and an alkyl phenol, said adduct having the formula:

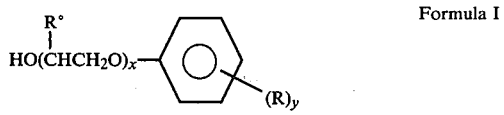

Formula I in which
R° is H or CH₃, preferably H,
x is an average of from 1 to 7, preferably 2 to 6, more preferably 3 to 5,
R is $C_1$ to $C_{12}$ alkyl, preferably $C_4$ to $C_{12}$ alkyl, more preferably $C_8$ to $C_{10}$ alkyl,
y is 1 or 2, preferably 1, and (2) a water insoluble plasticizer selected from at least one of a polyester of an alkanol and an aliphatic or aromatic carboxylic acid, the ratio of (1) to (2) on a weight basis being from about 10:90 to about 90:10, preferably between about 15:85 and about 60:40. Herein, the combination of (1) and (2) is referred to as the "plasticizer combination".

Preferred water-insoluble polyester plasticizers are one or more of those having the formulae:

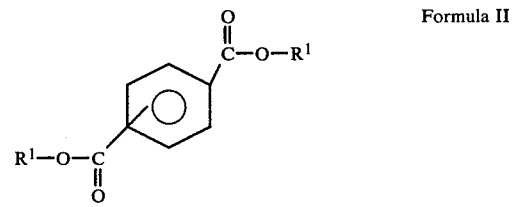

Formula II wherein $R^1$ and $R^2$, independently, are $C_4$-$C_{12}$ alkyl,

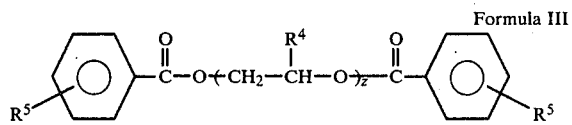

Formula III wherein
$R^5$ is H or $C_1$-$C_{10}$ alkyl,
$R^4$ is H or $CH_3$, and
z is 1 to 3,

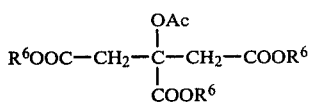

wherein each $R^6$ is $C_1$–$C_8$ alkyl, and

Formula V
wherein
$R^3$ is $C_1$–$C_{10}$ alkyl, and
o is 2–8.

In the compounds of Formula I, the ring position of the radical R preferably is predominantly para to the alkylene oxide substituent. The products used in the examples herein are such that y is 1, and the alkyl radical R is predominantly para to the alkylene oxide substituent. This water-insoluble ethylene oxide or propylene oxide condensate of the higher alkylphenol may be that derived from alkylphenols in which the alkyl group R may be methyl, isobutyl, n-octyl, t-octyl, nonyl, dodecyl, etc. The alkyl group is preferably of branched-chain character, such as in the case of t-octyl (1,1,3,3-tetramethyl butyl), 1,3,5-trimethyl hexyl ("nonyl"), etc. The more hydrophobic condensates are required in that they are characterized by freedom from foaming and a minimum sensitivity to water. Thus, those condensates having an average of 5 or less oxyethylene units (x is 5 or less) are generally the most advantageous. While the value of x is an average, the distribution, or deviation from a given value of x, is such that the material of Formula I is water-immiscible. The ester type of plasticizer is conventional as a plasticizer for polymeric materials, and is prepared by known methods.

The ester plasticizers and methods of preparing them are well known. For example, esters of Formula II can be prepared from phthalic, isophthalic, or terephthalic acids or lower esters thereof such as the methyl ester, and n-butanol, t-octanol, 2-ethylhexanol, isooctanol, dodecanol, or mixed alkanols. Compounds of Formula III can be prepared from diethylene glycol, triethylene glycol, tripropylene, glycol or the like and benzoic acid. Butyl, octyl, and ethylhexyl are typical $R^6$ alkyls of Formula IV. Suitable $C_1$–$C_{10}$ $R^3$ alkyls from the corresponding alkanols are as noted above for the other formulae, and for Formula V materials, suitable dicarboxylic acids are adipic and sebacic.

The alkylene oxide adducts have been used in the past as "surfactants" in dispersing pigments in coating compositions.

When either the material of Formula I or a material of one of Formulae II-V is used alone, as is shown by the Examples the caulks are not wholly satisfactory, as to properties such as low temperature flexibility, plasticizer efficiency, plasticizer permanence, consistency or viscosity, wood channel cracking, acceptable cost, or the like. Compounds of Formula I in which x is greater than about 7, e.g. an average of 8.0 to 10, become progressively more water sensitive. While such water soluble alkylene oxide adducts may appear to be satisfactory in the initial caulk, with weathering, the caulk loses the compound by leaching and becomes hard. The consistency or viscosity of the caulk increases as the value of x decreases; thus the most preferred values of x are 3–5. At any value of x in the range of 1–7, compounds of Formula I where $R°$ is H cannot be used in the absence of the ester plasticizers of Formulas II-V, because of this increased viscosity. If a volatile diluent such as water is used in large quantities to assuage the viscosity problem, shrinkage of the caulk upon drying is too great.

The weight ratio of plasticizer combination: elastomeric binder solids in the caulking composition is from about 0.01:1 to about 5:1, preferably from about 0.05:1 to about 2:1. The weight ratio of inorganic pigment and/or filler to elastomeric binder is from 0:1 (clear or translucent, for instance) to about 5:1, preferably about 1:1 to 4:1, more preferably 1.5:1 to 3:1.

In the plasticizer composition, the weight ratio of (1) to (2) is between about 10:90 and about 90:10, preferably from about 15:85 to about 60:40, provided that a useful consistency is obtained and the cured caulk flexibility is satisfactory.

Consistency of the formulated caulk, determined in the manner described below, is between 5 and 100 seconds, preferably 10–50 seconds, and most preferably 10–35 seconds.

Caulking compositions must be fluent enough as measured by consistency to be applied easily, and yet must not slump or flow to a great extent, after being applied to the substrate, nor shrink excessively upon drying or curing. An important compositional feature of caulks to give these properties is the solids content, "solids" being defined as the total materials present which are nonvolatile under ordinary conditions of use. For aqueous latex based caulking or sealing compositions according to the invention, the solids content is from about 65% to about 90% by weight, preferably about 75% to about 85% and more preferably from about 80% to about 85%. Solids content is kept as high as possible while yet achieving a useful consistency. Organic solvent based sealants or caulks also have as low a nonvolatile content as is possible, usually less than 15%, and greater than 5%, while yet providing a useable viscosity or consistency. If the solvent is a reactive or curable solvent such as drying oil or a liquid polymerizable material, solids content may even be 100%.

The composition that is applied as a sealing or caulking bead between the two substrates to be joined may be formed of any solvent based or latex based elastomeric material including silicone rubbers, 1,3-diene rubbers such as styrene-butadiene copolymer latexes, butadiene-acrylonitrile latex polymers, and the like.

However, the preferred aqueous-base caulking compositions with which the present invention is concerned are those having a binder of vinyl addition polymer type, such as of polyvinyl acetate and copolymers of vinyl acetate with 0.5 to 40% by weight of an acid, such as acrylic acid, methacrylic acid, maleic acid, fumaric acid, itaconic acid, crotonic acid, acryloxyacetic acid, methacryloxypropionic acid, etc, and vinyl acetate-ethylene copolymers having for instance 30–90% vinyl acetate therein.

Especially preferred elastomers are the polymers of acrylic acid esters, methacrylic acid esters, copolymers of two or more such esters with each other, copolymers of one or more such esters with each other, and also copolymers of one or more such esters with one or more of the following monoethylenically unsaturated compounds: vinyl acetate, vinyl chloride, vinylidene chloride, acrylonitrile, styrene, vinyltoluene, acrylamide, methacrylamide or of any of the acids mentioned above as components of vinyl acetate copolymers.

The most important of the acrylic esters are: ethyl acrylate, methyl acrylate, methyl methacrylate, butyl acrylate and methacrylate, and 2-ethylhexyl acrylate and methacrylate. Copolymers of these esters may be used, especially copolymers of one or more of these esters with 0.5 to 40% by weight of one of the acids mentioned above, preferably of acrylic acid, methacrylic acid, or itaconic acid.

High molecular weight polymers, e.g. 10,000 to several millions, obtained by emulsion polymerization and of water-insoluble character under neutral or acid conditions are generally used in such caulking compositions. The elastomer preferably has a molecular weight of 10,000 to 600,000.

When the vinyl polymer contains acid, it is generally neutralized partially or completely with ammonia or other volatile base, an alkali metal hydroxide, or an alkaline earth metal hydroxide. Examples of suitable caulking compositions and acrylic latex elastomers are those disclosed in said U.S. Pat. No. 3,561,996, which is incorporated herein by reference to the extent necessary to show such latexes and caulk formulations. The elastomers suitable for caulks are well known to those skilled in the art, as are methods of preparing them.

An important property of the solid elastomeric polymer is the $T_g$ thereof, and consequently the selection of monomers and proportions thereof depends upon their influence on the $T_g$. The $T_g$ of the polymer should be below 10° C. (i.e., it must give a rubbery product) preferably below 0° C., and is more preferably below −10° C. "$T_g$" is a conventional criterion of polymer hardness and is described by Flory, "Principal of Polymer Chemistry," pp. 56 and 57 (1953), Cornell University Press. See also "Polymer Handbook," Brandrup and Immergut, Sec. III, pp. 61-63, Interscience (1966). While actual measurement of the $T_g$ is preferred, it may be calculated as described by Fox, Bull. Am. Physics Soc. 1, 3, p. 123 (1956). Examples of the $T_g$ of homopolymers and the inherent $T_g$ thereof which permits such calculations are as follows:

| Homopolymer of | $T_g$ |
| --- | --- |
| n-octyl acrylate | −80° C. |
| n-decyl methacrylate | −60° C. |
| 2-ethylhexyl acrylate | −70° C. |
| n-butyl acrylate | −56° C. |
| octyl methacrylate | −20° C. |
| methyl acrylate | 9° C. |
| t-butyl acrylate | 43° C. |
| methyl methacrylate | 105° C. |
| acrylic acid | 106°0 C. |

These or other monomers are blended to give the desired $T_g$ of the copolymer.

The fillers or pigments, if used, are present in an amount depending upon the consistency desired, the presence or absence of thickening agents, and so forth. Suitable inert fillers and pigments include calcite, limestone (calcium carbonate), mica, talc, asbestos fiber or powder, diatomaceous earth, barytes, alumina, slate flour, calcium silicate, clay, colloidal silica, magnesium carbonate, titanium dioxide, carbon black, iron oxide, chrome green, phthalocyanine blue, magnesium silicate, and so on. The amounts of solvent, if any, filler, if any, and polymer solids are such as to give the caulking composition a putty-like or dough-like consistency.

The usual surfactants and emulsifiers commonly used in preparing or formulating latex polymers may be present. These include anionic, nonionic, and cationic materials.

It is helpful, in some cases, to utilize a silane to improve wet adhesion to glass by the caulk. Suitable silanes include vinyltriethoxysilane, -methacryloxypropyltrimethoxysilane, -mercaptopropyltrimethoxysilane, -glycidoxypropyltrimethoxysilane, -(3,4-epoxycyclohexyl)ethyltrimethoxysilane, -aminopropyltrietoxysilane, and N-(dimethoxymethylsilylisobutyl)ethylenediamine. The silane concentration may be between about 0.05 percent and 0.5 percent of the total caulking composition. Higher amounts may be used but do not result in proportional improvements in adhesion.

A base may be present as noted above, for example to neutralize carboxylic acid groups occuring in the elastomeric polymer. Suitable is a volatile base such as ammonia or a volatile water-soluble amine such as dimethylamine, triethylamine, triethanolamine, morpholine, N-methyl morpholine, picoline, and the like, as well as inorganic bases.

A prior art formulation, hereinafter called the "basic formulation," is as follows:

| Component | Parts |
| --- | --- |
| EA/MMA/IA 87.5/10/2.5 emulsion copolymer 55% solids* | 430.17 |
| Octyl phenol reacted with ethylene oxide approximately 1/40 molar ratio, 70% solids (Triton$^R$ X-405, emulsifier) | 9.46 |
| Sodium polyphosphate (pigment dispersant) | 10.65 |
| Plasticizer (In the Basic Formulation adduct of cresol reacted with propylene oxide, 1/6 molar ratio)** | 124.21 |
| Mineral solvent thinner ("Varsol" TM) | 26.91 |
| Glycidoxypropyltrimethoxy silane (wet adhesion promoter, premixed with plasticizer or solvent) | 0.59 |
| Sodium polymethacrylate, 30% solids in water (pigment dispersant) | 1.27 |
| Ammonium hydroxide 28% | 1.84 |
| Ground calcium carbonate, ave 4μ, oil adsorption 14 (filler) | 692.06 |
| Titanium dioxide (rutile), oil adsorption 24 (pigment) | 17.72 |
| Sag 470 TM (polydimethyl siloxane, 10% solids, a defoamer) | 1.0 |

*EA is ethyl acrylate, MMA is methyl methacrylate, IA is itaconic acid. As elsewhere herein, all parts are by weight unless otherwise specified. The polymer has a minimum film forming temperature of less than 2° C., the $T_g$ is about −9° C., and the pH of the latex is about 4.5. The latex is anionic.
**This plasticizer when used alone, is not as desirable as the plasticizer combination of the invention. For example, cost is a factor. Other factors appear in connection with the examples.

Preparation of the caulk from its components is done by mixing the components in the order shown in a high shear mill, e.g., a Sigma mixer. Milling time in these examples is 90 minutes. "Sag 470" is added in the last five minutes of mixing. All materials are added directly to the mill with no need to prepare solutions or eulsions of liquid and solid components. The finished caulk is transferred to plastic lined paper tubes and is suitable for interior or exterior application to seal crevices and gaps such as around windows, doors, bathroom appliances, etc.

Formulations used in the following examples are the same as in the Basic Formulation, the difference being in the plasticizer composition or combination.

The test methods for determining the properties specified in the following examples are conventional in the art. Note for example U.S. Pat. Nos. 3,561,996 and 3,919,146, as well as Resin Review, V. XVI, No. 3, (1966) "Test Procedures for Evaluating Aqueous Caulking Components and Elastomeric Solvent-Base Sealants," Rohm and Haas Company, Philadelphia, Penn. 19105. These documents are incorporated herein by reference to the extent necessary to enable the use of the methods.

Among the test methods are the following.

Consistency is the time to gun a 6 fl. oz. (177.4 ml) conventional cylindrical caulking tube (6×1 9/16 in. or 1.24×4 cm. inside diameter cylindrical tube having a ⅛ in. diameter nozzle tip orifice) under 50 psi (3515 kg/m$^2$) line pressure. The test method is that of Federal Specification TTS00230. Wood channel cracking is determined by filling white pine channels ¾" (19.05 mm) wide by ⅜" (9.53 mm) deep with caulk, leveling the surface of the caulk flush with the wood channels, then allowing the filled channel to dry. Drying, for instance, is under two sets of conditions, at room temperature for seven days and at 50° C. for seven days. Each gives comparable results. Low temperature flexibility is determined using dried slabs of caulk 1½"×4½" (38.1 mm×114.3 mm), ¼" (0.35 mm) thick when wet, cast on 1 mm aluminum plates. Slabs are cooled to the test temperature then flexed by bending them over a series of mandrels; first 4" (101.6 mm) diameter, then 2" (50.8 mm) diameter, then 1" (25.4 mm) diameter, and finally the slab is folded back upon itself to give a 180° flex. The integrity of the slab after each mandrel test is determined using dried caulk dumbbells ¼" (6.35 mm) wide by ¼" (6.35 mm) thick at the neck. The Instron Tensile Tester is used to elongate the sample at 0.2 in./min. (5.08 mm/min.) with a 0.5 in. (12.7 mm) jaw gap. Peel strength, freeze-thaw stability, weatherometer exposure, and other procedures are as described in the *Resin Review* article, supra.

In the following examples, the basic formulation given above was used, the difference being in the identity of the plasticizer. The abbreviations used have the meanings:

| Abbrev. | Meaning |
| --- | --- |
| X-1 | Adduct of Formula I, R° = CH$_3$, x = 6, y = 1, R = methyl. |
| X-3 | Adduct of Formula I, R° = H, x = 3, y = 1, R = 1,1,3,3-tetramethyl butyl ("tert.-octyl"). |
| X-4 | Adduct of Formula I, R° = H, x = 5, y = 1, R = 1,1,3,3-tetramethyl butyl. |
| N-4 | Adduct of Formula I, R° = H, x = 4, y = 1, R = trimethyl hexyl ("nonyl"). |
| N-5 | Adduct of Formula I, R° = H, x = 5, y = 1, R = trimethyl hexyl. |
| N-6 | Adduct of Formula I, R° = H, x = 6, y = 1, R = trimethyl hexyl. |
| DOP | Dioctyl phthalate |
| DBP | Dibutyl phthalate |
| DIBP | Diisobutyl phthalate |
| DINP | Diisononyl phthalate |
| BIDP | Butyl isodecyl phthalate |
| DPGD | Dipropylene glycol dibenzoate |

In the case where R is "nonyl", that is, trimethyl hexyl, about 75% is the 1,3,5-trimethyl hexyl isomer on a molar basis, with the remainder being other trimethyl hexyl isomers. The alkyl phenols used in preparing the adducts are usually mixtures of the meta or ortho and para isomers, and may contain small amounts of impurities. In the adducts identified as X-3, X-4, N-4, N-5, and N-6, R is about 90:10 p:o, molar basis, with respect to the alkylene oxide substituent. In the X-1 adduct, R is about 80% para, meta, with about 2% ortho cresol, the remainder being xylenols and other impurities.

The following examples and comparative examples illustrate the invention and advantages thereof.

TABLE I

| Plasticizer | Consistency[1] (sec) | Wood Channel Cracking[2] | Low Temp. Flexibility[3] −15° F. | Low Temp. Flexibility[3] 0° F. | Shore "A" Hardness Air Dried 2 wk | Shore "A" Hardness Air Dried 2 wk + 3 wk 70° C. | Film Properties[4] Tensile Strength lb/in$^2$ (kg/cm$^2$) | Film Properties[4] Elongation (%) |
| --- | --- | --- | --- | --- | --- | --- | --- | --- |
| X-1 | 15 | Pass | Pass | Pass | 8 | 42 | 58(.408) | 424 |
| X-3 | very high 300 | Complete adhesion loss | Fail | Pass | 5 | 39 | | |
| X-4 | very high 300 | Pass | | | | | | |
| N-4 | 174[5] | Pass | Fail | Pass | 0 | 31 | | |
| N-5 | 156[5] | Adhesion loss | Fail | Pass | 12 | 42 | | |
| N-6 | 290[5] | Adhesion loss | Fail | Pass | 9 | 41 | | |
| DOP | 35[6] | Pass | Fail | Pass | 32 | 50 | 121 (21.6) | 225 |
| N-4/DOP 25/75 | 18 | Pass | Pass | Pass | 13 | 42 | 73 (13) | 303 |
| N-4/DOP 50/50 | 64 | Pass | Pass | Pass | 0 | 39 | | |
| X-3/DOP 25/75 | 25 | Pass | Pass | Pass | 17 | 42 | | |
| X-3/DOP 50/50 | 57 | Pass | Pass | Pass | 12 | 39 | | |

[1]Time to gun a 6 fl. oz. (177.4 ml) cartridge under 50 lb/in$^2$ (.3515 kg/cm$^2$) pressure. Consistency given is for freshly made caulk.
[2]¾" × ⅜" (19.05 mm × 9.53 mm) pine wood channel
[3]180° bend.
[4]Tensile strength and % elongation at maximum shear.
[5]Consistency increased greatly on aging at R.T. (room temperature, about 20° C. ± 3° C.).
[6]Consistency doubled on aging at R.T.

TABLE II

| Plasticizer | Consistency (sec) | Wood Channel Cracking[2] | Low Temp. Flexibility[7] −15° F. | Low Temp. Flexibility[7] 0° F. | Shore "A" Hardness Air Dried 2 wk | Shore "A" Hardness Air Dried 2 wk + 3 wk 70° C. |
|---|---|---|---|---|---|---|
| N-4 | 174[8] | Pass | Fail | Pass | 12 | 42 |
| DIBP | 8 | Pass | Pass | Pass | 48 | 55 |
| N-4/DIBP 25/75 | 13 | Pass | Pass | Pass | 11 | 47 |
| N-4/DIBP 50/50 | 31 | Pass | Pass | Pass | 0 | 40 |
| DINP | 31[8] | Severe Cracking | Fail | Fail | 36 | 47 |
| N-4/DINP 25/75 | 14 | Pass | Fail | Pass | 20 | 40 |
| N-4/DINP 50/50 | 45 | Pass | Pass | Pass | 0 | 38 |
| BIDP | 15 | Pass | Pass | Pass | 45 | 51 |
| N-4/BIDP 25/75 | 24 | Pass | Pass | Pass | 20 | 49 |
| N-4/BIDP 50/50 | 62 | Pass | Pass | Pass | 0 | 47 |
| DPGD | 9 | Pass | Fail | Pass | 30 | 50 |
| N-4/DPGD 25/75 | 26 | Pass | Fail | Pass | 22 | 53 |
| N-4/DPGD 50/50 | 29[8] | Pass | Pass | Pass | 7 | 48 |

[7]1" diameter mandrel.
[8]Consistency increased greatly on aging at R.T.

Approximate relative costs of some of the materials are of interest.

TABLE III

| Plasticizer | Cost ($/lb. Bulk) |
|---|---|
| X-1 | $0.75 |
| X-3 | 0.50 |
| N-4 | 0.50 |
| DOP | 0.30 |
| DBP | 0.35 |
| DIBP | 0.35 |
| DINP | 0.30 |
| DPGD | 0.35 |
| BIDP | 0.30 |

These materials are water-immiscible liquids at 70° F.

The caulking material of Tables IV–VIII were prepared using the basic formulation but in most cases in quantities four times the amount to give one gallon samples.

TABLE IV

Properties of Caulks Prepared From Basic Formulation[1] on Gallon Scale

| Plasticizer | X-1 | N-4/DOP 25/75 | N-4/DIBP 25/75 | N-4/DPGD 25/75 | DOP | DIBP | DBGD |
|---|---|---|---|---|---|---|---|
| Consistency (sec) | | | | | | | |
| Initial | 15 (13) | 18 (33) | 22 (17) | 25 (22) | 35 (38) | 19 (15) | 28 (19) |
| 1 Month 50° C. | (13) | 25 (42) | 25 (20) | 31 (23) | 85 (44) | 18 (16) | 33 (17) |
| Slump (⅛") | 0 | 0 | 0 | 0 | 0 | 0 | 0 |
| Low Temp. Flex. (−15° F.) | | | | | | | |
| 3 Days RT, | Pass[2] | Pass | Pass | Fail[3] | Fail[5] | Fail[3] | Fail[5] |
| 7 Days 50° C. | (Pass) | (Pass) | (Pass) | (Fail[4]) | (Fail[5]) | (Fail[4]) | (Fail[5]) |
| 3 Days RT, | Fail[6] | Pass | Pass[7] | Pass[7] | Fail[8] | Fail[5] | Fail[8] |
| 7 Days: 50° C., Weatherometer 500 hr. | | | | | | | |
| Wood Channel Cracking | | | | | | | |
| RT (¼" × ¾") | Pass | Pass | Pass | Pass | Pass | Pass | Pass |
| | (Pass) | (Pass) | (Pass) | (Pass) | (Pass) | (Pass) | (Pass) |
| 50° C. (¾" × ¾") | Pass | Pass | Pass | Pass | Pass | Pass | Pass |
| | (Pass) | (Pass) | (Pass) | (Pass) | (Pass) | (Pass) | (Pass) |
| Weatherometer 500 hr. (¼" × ½") | Pass | Pass | Pass | Pass | Pass | Pass | Pass |

[1] Values shown in parentheses are for repeat preparations made using a different lot of the acrylic latex. (RT is room temperature, about 20°C ± 3°)
[2] 1", 2", and 4" refer to diameter in inches of cylindrical mandrel around which film bent.
[3] Pass 1", fail 180°.
[4] Crack 1", fail 180°.
[5] Pass 2", fail 1".
[6] Pass 4", fail 2".
[7] Cracking 180°.
[8] Crack 2", fail 1".

TABLE V

Properties of Caulks Containing Dioctyl Phthalate/Plasticizer X-1 Mixtures in Place of X-1 Alone

| DOP/X-1 Ratio | 100/0 | 75/25 | 50/50 | 25/75 | 0/100 |
|---|---|---|---|---|---|
| Consistency (sec) | | | | | |
| Initial | 35 | 17 | 15 | 10 | 9 |
| 30 Days 50° C. | 60 | 23 | 18 | 12 | 13 |
| Wood Channel Crack Resistance | | | | | |
| RT (20° 22°) | Excellent | Excellent | Excellent | Excellent | Excellent |
| 50° C. | Excellent | Excellent | Excellent | Excellent | Excellent |

TABLE V-continued

Properties of Caulks Containing Dioctyl Phthalate/Plasticizer X-1 Mixtures in Place of X-1 Alone

| DOP/X-1 Ratio | 100/0 | 75/25 | 50/50 | 25/75 | 0/100 |
|---|---|---|---|---|---|
| Low Temp. Flexibility (−15° C.)[1] | | | | | |
| 2 Weeks RT | Failed 180° Flex | Passed 180° Flex | Passed 180° Flex | Passed 180° Flex | Passed 180° Flex |
| 2 Weeks 50° C. | Failed 2" Mandrel | Failed 180° Flex | Passed 180° Flex | Passed 180° Flex | Passed 180° Flex |
| Shore "A" Hardness | | | | | |
| 2 Weeks RT | 36 | 35 | 30 | 26 | 25 |
| 2 Weeks RT + 2 Weeks 50° C. | 58 | 51 | 52 | 47 | 45 |
| 2 Weeks RT + 3 Weeks 50° C. | 52 | 46 | 50 | 45 | 43 |

[1] Test Sequence: 4" mandrel, 2" mandrel, 1" mandrel, 180° Flex.

TABLE VI

Properties of Caulks Prepared From Basic Formulation on Gallon Scale

| Plasticizer | | X-1 | N-4/DOP 25/75 | N-4/DIBP 25/75 | N-4/DPGD 25/75 | DOP | DIBP | DBGD |
|---|---|---|---|---|---|---|---|---|
| Freeze Thaw Statility (cycles passed) | | 3 | 3 | 1 | 3 | 2 | 0 | 0 |
| Peel Strength (lb/in) | | | | | | | | |
| Aluminum | Dry | 8.1 CP[3] | 2.1 A/LC | 2.1 A/LC | 3.4 A/LC | 1.3 A/LC | 4.5 CP | 4.3 CP |
| | Wet | 0 A | 0 A | 0 A | 0 A | 0 A | 0 A | 0 A |
| Glass | Dry | 9.1 CP | 7.8 CP | 7.6 CP | 7.1 CP | 1.7 A/C | 3.8 CP | 4.5 CP |
| | Wet | 2.5 CP | irr.[2] | 0.1 A | 2.0 CP | 0.5 CP | 0.8 CP | 1.0 CP |
| Wood | Dry | 2.5 A | 1.7 A | 2.4 A/LC | 2.7 A/LC | 1.1 A | 1.7 A | 2.0 A |
| | Wet | 0.3 A | 0.2 A | 0.2 A | 0.3 A | 0.2 A | 0.7 A | 0.5 A |

[1] Caulks are the same as repeat preparation in Table IV.
[2] Irregular values varied widely in different areas; 1.4 CP, 0.6 CP, 0.2 A.; probably this sample incompletely cured.
[3] A is adhesive failure between the soiled substrate and the caulking material.
C is cohesive failure within the body of the caulk layer.
CP is the case in which the adhesion to the substrate is greater than to the fabric top layer.
LC is light cohesive failure of the caulk. Small patches or spots remain on the substrate; failure is thus mostly adhesive.

The data in Table VII show a marked deficiency for BIDP used alone in this formulation in consistency, stability, low temperature flexibility, and hardness.

TABLE VII

| Plasticizer | X-1 | BIDP | BIDP/X-3 (75/25) |
|---|---|---|---|
| Consistency (sec) | | | |
| Initial | 17 | 32 | 24 |
| 1 mo RT | 31 | 102 | 74 |
| 1 mo 50° C. | 41 | 168 | 96 |
| Slump (in., vertical) | 0 | 0 | 0 |
| Low Temp. Flex (180° Flex) | | | |
| RT dry, 2 wk         0° F. | Pass | Pass | Pass |
|                     −15° F. | Pass | Fail[1,3] | Pass |
| RT dry, 3 days,     0° F. | Pass | Fail[1] | Pass |
| 50° C. 7 days, 500 hr | | | |
| Weatherometer      −15° F. | Pass[4] | Fail[2] | Pass |
| Channel Cracking (⅛" × ¾") | | | |
| RT 7 days | Pass | Pass | Pass |
| 50° C. 7 days | Pass | Pass | Pass |
| Hardness (Shore "A") | | | |
| 2 wk RT | 12 | 25 | 11 |
| 2 wk RT + 3 wk 70° C. | 39 | 51 | 40 |
| 2 wk RT + Weatherometer 500 hr | 46 | 56 | 48 |

[1] Fail 2" flex (2" mandrel)
[2] Fail 4" mandrel.
[3] Different caulk batch, Table II, passed.
[4] Different caulk batch, Table IV, failed 2 inch mandrel.

TABLE VIII

Weight Loss of Caulks on Hot Water (at 70° C. for 1 month) Extraction

| | Weight Loss (%)[2] | |
|---|---|---|
| Plasticizer | Same Water Throughout | Water Changed Weekly |
| X-1 | 3.9 | 6.4 |
| N-4/DOP (25/75) | 1.8 | 2.1 |
| N-4/DIBP (25/75) | 4.9 | 5.2 |
| N-4/DPGD (25/75) | 3.0 | 3.4 |

[1] Caulk samples air dried to constant weight before extraction
[2] 4.5 gm disc of cured caulk, ~⅛ in. thick, extracted in 250 ml water. Plasticizer is about 12% of caulk solids.

In considering the test results of Table III–VII, it should be borne in mind that the caulks under study were prepared by "plugging in" the various plasticizers in the standard Basic Formulation; i.e., the same total amount of plasticizer or combinations thereof as is given in the Basic Formulation. No attempt was made, by even minor compounding modifications, to alter properties found wanting.

The results place in perspective the mixtures of alkylphenol/alkylene oxide adducts with ester plasticizers vis-a-vis the prior art caulk plasticizer X-1 by itself and the ester plasticizers themselves. Overall the plasticizer combination mixtures approximate X-1 in performance at lower cost and show advantages over the ester plasticizers. This is especially true of the mixture with dioctyl phthalate which is the lowest cost ester plasticizer readily available.

In caulk performance properties reflecting plasticizer efficiency, i.e., Shore hardness, reduction in $T_g$, low temperature flexibility and tensile/elongation the plasticizer mixtures are near matches for X-1 and are superior to the ester plasticizer. In plasticizer permanence the mixtures appear to have advantages over both X-1 and the ester plasticizers (Weatherometer data under LTF and Shore hardness, Table IV, and extraction data, Table VI).

The mixtures show deficiencies in caulk consistency and adhesion. Caulk consistency is higher than is produced with X-1 and varies considerably as DOP source and latex lots is varied, but is affected only slightly by accelerated or natural caulk aging. Caulks, at the consistencies produced by the mixtures, are usable and there is not a serious consistency problem; consistency can be lowered by reducing total solids content, even a very slight lowering in some cases, but must be controlled to avoid seriously affecting shrinkage. Nevertheless, routine study of consistency is justified. Adhesion data reported are for one week drying only, and at this drying time, drying may not be complete. Study of adhesion at varying drying intervals and after minor formulation and mixing procedure modifications are within the realm of routine experimentation.

Herein, whenever a range of values is given, such as "from 1 to 7", "1–7", or "between 1 and 7", it is intended that the range be inclusive of the stated values, in this case, 1 and 7. All parts are by weight unless otherwise specified. "(Meth)acrylic" acid refers to methacrylic acid or acrylic acid.

We claim:

1. In a putty-like mastic, caulking, or sealant composition containing a binder consisting essentially of an elastomer in the form of a synthetic polymer and a water insoluble plasticizer, in the weight ratios of plasticizer:binder of from about 0.01:1 to about 5:1, and optionally containing one or more additives in the form of an emulsifier, a dispersant, an organic solvent, a base, a pigment, a filler, a dye, a defoamer, a thickener and an adhesion promoter, and the like, the improvement in which the plasticizer is a combination of (1) a water-immiscible adduct of ethylene oxide or propylene oxide and an alkyl phenol, said adduct having the formula

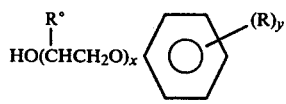

Formula I in which
R° is H or CH$^3$,
x is from 1 to 7,
R is C$_1$ to C$_{12}$ alkyl, and
y is 1 or 2, and
(2) a water insoluble plasticizer selected from at least one of a polyester of an alcohol and an aliphatic or aromatic carboxylic acid, the ratio of (1) to (2) on a weight basis being from about 10:90 to about 90:10, and in which the caulk consistency is between 5 seconds and 100 seconds.

2. The composition of claim 1 in which the weight ratio of plasticizer combination:elastomer is from about 0.5:1 and about 2:1, an inorganic pigment or filler is present in the weight ratio to elastomer of between about 1:1 and 5:1, said ratio of (1) to (2) is between about 15:85 and about 60:40, and said consistency is between 10 seconds and 50 seconds.

3. The composition of claim 1 in which the binder is an aqueous latex of an addition polymer of olefinically unsaturated monomers, x is 2 to 6, R° is H, y is 1, and R is C$_4$ to C$_{12}$ alkyl.

4. The composition of claim 2 in which the binder is an aqueous latex of an addition polymer of olefinically unsaturated monomers, said consistency is between 10 and 35 seconds, and the solids content is at least 75%.

5. The composition of claim 3 in which the latex is of an addition polymer at least predominantly of an 1,3-diene, vinyl acetate, or a (meth)acrylic ester of an alcohol, and the solids content is at least 75%.

6. The composition of claim 4 in which the latex is of an addition polymer at least predominantly of a 1,3-diene, vinyl acetate, or a (meth)acrylic ester of an alcohol.

7. The composition of claim 5 in which the water insoluble plasticizer contains one or more of the plasticizers of the formulae:

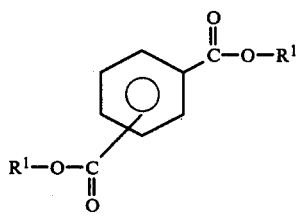

Formula II wherein R$^1$ and R$^2$, independently, are C$_4$–C$_{12}$ alkyl;

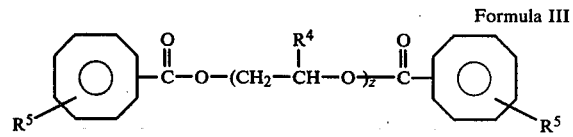

Formula III wherein
R$^5$ is H or C$_1$–C$_{10}$ alkyl,
R$^4$ is H or CH$_3$, and
z is 1 to 3;

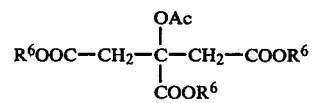

Formula IV wherein each R$^6$ is C$_1$–C$_8$ alkyl; and

Formula V
wherein
R$^3$ is C$_1$–C$_{10}$ alkyl, and
o is 2–8.

8. The composition of claim 7 in which the water insoluble plasticizer includes one of the materials of Formulae II and III, and the latex is an acrylic latex.

9. The composition of claim 8 in which the binder in the latex polymer is at least predominantly of an ester of (meth)acrylic acid with an alkanol or an alkoxyalkanol having up to about 14 carbon atoms, the T$_g$ of the polymer is below about 10° C., x is 3–5, R is C$_8$–C$_{10}$ alkyl, y is 1, R is at least predominantly para to the alkylene oxide substituent, and in which component (2) is dioctyl phthalate.

10. The composition of any of claims 6, 7, or 8 in which the ester plasticizer (2) of the plasticizer combination is dioctyl phthalate.

11. A plasticizing composition containing a combination of (1) a water insoluble adduct of ethylene oxide and an alkyl phenol, said adduct having the formula

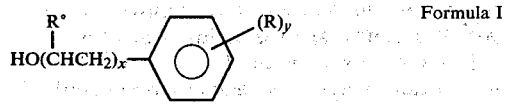

Formula I in which
R° is H or CH$_3$,
x is from 1 to 7,
R is C$_1$ to C$_{12}$ alkyl, and
y is 1 or 2, and

(2) a water insoluble plasticizer selected from at least one of a polyester of an alcohol and an aliphatic or aromatic carboxylic acid, the ratio of (1) to (2) on a weight basis being from about 10:90 to about 90:10.

12. The composition of claim 11 in which the weight ratio of (1) to (2) is between about 15:85 and 60:40.

13. The composition of claim 12 in which the water insoluble plasticizer contains one or more materials of the formulae:

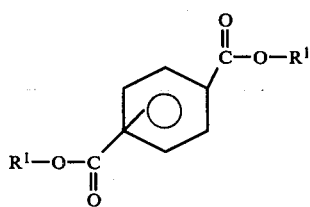

Formula II wherein R$^1$ and R$^2$, independently, are C$_4$–C$_{12}$ alkyl,

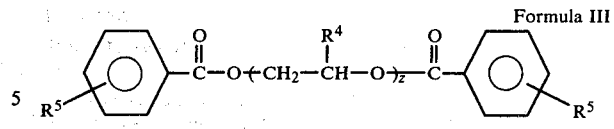

Formula III wherein
R$^5$ is H or C$_1$–C$_{10}$ alkyl,
R$^4$ is H or CH$_3$, and
z is 1 to 3

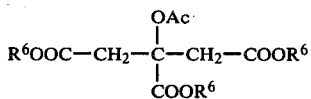

Formula IV wherein each R$^6$ is C$_1$–C$_8$ alkyl, and $$R^3OOC-(CH_2)_o-COOR^3$$

Formula V
wherein
R$^3$ is C$_1$–C$_{10}$ alkyl, and
o is 2–8.

14. The composition of claim 13 in which the water insoluble plasticizer includes one of the materials of Formulae II and III, R° is H, x is 2-6, R is C$_4$ to C$_{12}$ alkyl, and y is 1.

15. The composition of any of claims 11, 12, 13, or 14 in which said water-insoluble ester plasticizer (2) is dioctyl phthalate, x is 3-5, R is C$_8$–C$_{10}$ alkyl, and R is at least predominantly para to the alkylene oxide substituent.

16. In a process of caulking, the steps of applying a bead of the composition of any of claims 7, 8, or 9, and curing the caulk.

17. A cured caulk of the composition of any of claims 7, 8, or 9.

* * * * *